(12) United States Patent
Parker

(10) Patent No.: US 11,553,765 B2
(45) Date of Patent: Jan. 17, 2023

(54) LATCH ASSEMBLY

(71) Applicant: Linda Kay Parker, Denton, TX (US)

(72) Inventor: Linda Kay Parker, Denton, TX (US)

( * ) Notice: Subject to any disclaimer, the term of this patent is extended or adjusted under 35 U.S.C. 154(b) by 733 days.

(21) Appl. No.: 16/455,487

(22) Filed: Jun. 27, 2019

(65) Prior Publication Data

US 2020/0405014 A1    Dec. 31, 2020

(51) Int. Cl.
| | |
|---|---|
| *E05B 65/52* | (2006.01) |
| *E05C 19/12* | (2006.01) |
| *E05C 3/14* | (2006.01) |
| *E05C 3/34* | (2006.01) |
| *A44B 11/25* | (2006.01) |
| *A44B 11/26* | (2006.01) |
| *F16M 13/02* | (2006.01) |

(52) U.S. Cl.
CPC ........ *A44B 11/2592* (2013.01); *A44B 11/266* (2013.01); *E05B 65/52* (2013.01); *E05C 3/145* (2013.01); *E05C 19/12* (2013.01); *E05C 3/34* (2013.01); *F16M 13/02* (2013.01); *Y10S 292/04* (2013.01); *Y10T 24/45702* (2015.01); *Y10T 292/081* (2015.04); *Y10T 292/0829* (2015.04); *Y10T 292/0831* (2015.04)

(58) Field of Classification Search
CPC ... E05C 3/145; E05C 9/12; E05C 3/34; Y10T 292/081; Y10T 24/45702; Y10T 292/1022; Y10T 292/082; Y10T 292/0805; Y10T 292/0862; Y10T 292/096; Y10T 292/0948; Y10T 292/0997; Y10T 292/1028; Y10T 292/1078; Y10T 292/0894; Y10T 292/0969; Y10T 292/696; Y10T 292/702; Y10T 292/0829; A44B 11/2592; A44B 11/266; A44B 11/2519; F16B 13/02; E05B 65/52; Y10S 292/04
See application file for complete search history.

(56) References Cited

U.S. PATENT DOCUMENTS

| | | | | |
|---|---|---|---|---|
| 72,692 | A * | 12/1867 | Smith et al. | E05C 3/34 292/124 |
| 218,612 | A * | 8/1879 | Yeagley | E05C 3/34 292/49 |
| 274,658 | A * | 3/1883 | Rees et al. | E05C 3/34 292/DIG. 46 |

(Continued)

*Primary Examiner* — Christine M Mills
*Assistant Examiner* — Faria F Ahmad
(74) *Attorney, Agent, or Firm* — Jason P. Webb; Pearson Butler

(57) ABSTRACT

A latch assembly having a latch buckle and a latch tongue. The latch buckle includes: a buckle housing; a first lateral aperture disposed along a first side of the buckle housing; a second lateral aperture disposed along a second side of the buckle housing; a pair of h-shaped levers, each pivotally coupled to an interior of the buckle housing; a spring ring disposed between the pair of h-shaped levers; a pair of springs, each spring being coupled to an interior of the buckle housing and an h-shaped lever; and a buckle aperture disposed along a top of the buckle housing and between the pair of h-shaped levers. The latch tongue includes: a tongue plate; a plate spacer, coupled to the tongue plate; and a latch flange, coupled to the plate spacer, configured to be received by the buckle aperture. The latch tongue is selectably coupled to the latch base.

20 Claims, 7 Drawing Sheets

(56) References Cited

U.S. PATENT DOCUMENTS

| | | | | |
|---|---|---|---|---|
| 509,304 A * | 11/1893 | Forbes | E05C 3/34 | 292/27 |
| 664,144 A * | 12/1900 | Gerhardt | H01R 13/6275 | 439/372 |
| 940,213 A * | 11/1909 | Stubblefield | F16B 21/06 | 24/648 |
| 988,114 A * | 3/1911 | La Belle | E05C 3/34 | 292/27 |
| 1,026,591 A * | 5/1912 | Kohler | E05B 65/52 | 70/80 |
| 1,209,369 A * | 12/1916 | Wood | A44B 11/2519 | 24/648 |
| 1,247,258 A * | 11/1917 | Geisert | A44B 11/2519 | 24/648 |
| 1,252,776 A * | 1/1918 | Camper | E05C 3/34 | 292/106 |
| 1,574,023 A * | 2/1926 | Crompton | E05C 3/34 | 292/DIG. 40 |
| 2,118,729 A * | 5/1938 | Hogan | E05B 65/0858 | 292/49 |
| 2,847,748 A * | 8/1958 | Robinton | A44B 11/2519 | 24/313 |
| 2,856,665 A * | 10/1958 | Gimalouski | B64D 17/32 | 24/635 |
| 2,967,418 A * | 1/1961 | Donald | E05B 63/127 | 292/6 |
| 2,970,796 A * | 2/1961 | Ross | B64D 17/38 | 24/632 |
| 3,090,092 A * | 5/1963 | Szemplak | A44B 11/2519 | 24/648 |
| 3,168,770 A * | 2/1965 | John, Jr. | A44B 11/2519 | 24/648 |
| 3,201,840 A * | 8/1965 | Jantzen | A44B 11/2519 | 24/639 |
| 3,262,169 A * | 7/1966 | Jantzen | A44B 11/2557 | 24/634 |
| 3,371,511 A | 3/1968 | Atkinson | | |
| 3,523,342 A * | 8/1970 | Spires | A44B 11/2542 | 297/483 |
| 3,561,802 A * | 2/1971 | Brockway | E05C 3/34 | 292/49 |
| 3,605,210 A | 9/1971 | Lohr | | |
| 3,631,571 A * | 1/1972 | Stoffel | A44B 11/2511 | 24/635 |
| 3,648,333 A * | 3/1972 | Stoffel | A44B 11/2511 | 24/635 |
| 3,649,999 A * | 3/1972 | Stoffel | A44B 11/2511 | 24/635 |
| 3,727,657 A | 4/1973 | Landis | | |
| 3,789,467 A * | 2/1974 | Aratani | A42B 3/08 | 24/313 |
| 4,313,246 A * | 2/1982 | Fohl | A44B 11/2523 | 24/635 |
| 4,317,263 A * | 3/1982 | Fohl | A44B 11/2511 | 24/635 |
| 4,321,734 A | 3/1982 | Gandelman | | |
| 4,453,743 A | 6/1984 | Sanders et al. | | |
| 4,482,175 A * | 11/1984 | Sugie | E05C 19/022 | 292/45 |
| 4,500,120 A * | 2/1985 | Ridgewell | E05B 65/0858 | 292/19 |
| 4,570,310 A * | 2/1986 | Gelula | B63H 9/10 | 24/631 |
| 4,578,844 A * | 4/1986 | Gelula | F16B 1/00 | 24/631 |
| 4,602,406 A * | 7/1986 | Gelula | F16B 1/00 | 24/631 |
| 4,637,102 A * | 1/1987 | Teder | A44B 11/2523 | 24/642 |
| 4,709,949 A * | 12/1987 | Umezawa | E05C 19/022 | 292/6 |
| 4,766,654 A | 8/1988 | Sugimoto | | |
| 4,792,165 A | 12/1988 | Nishimura | | |
| 4,836,707 A * | 6/1989 | Myers | B25J 15/028 | 403/328 |
| 5,142,748 A * | 9/1992 | Anthony | A44B 11/2549 | 24/642 |
| 5,144,725 A * | 9/1992 | Krauss | A44B 11/266 | 24/616 |
| 5,193,368 A * | 3/1993 | Ling | E05B 37/02 | 70/30 |
| 5,193,861 A * | 3/1993 | Juga | E05C 3/34 | 292/49 |
| 5,217,262 A | 6/1993 | Kurosaki | | |
| 5,273,328 A | 12/1993 | Kurosaki | | |
| 5,327,619 A | 7/1994 | Ortega | | |
| 5,557,954 A | 9/1996 | Ling | | |
| 6,454,320 B1 | 9/2002 | Weinerman et al. | | |
| 6,669,248 B2 | 12/2003 | Shirase | | |
| 7,520,036 B1 * | 4/2009 | Baldwin | A44B 11/2561 | 24/642 |
| 9,521,882 B2 * | 12/2016 | Hung | A44B 11/2511 | |
| 9,578,929 B2 * | 2/2017 | Hung | A44B 11/2511 | |
| 10,357,083 B2 * | 7/2019 | Babin | A44B 11/2561 | |
| 10,376,021 B2 * | 8/2019 | Hsu | A44B 11/2573 | |
| 10,609,989 B2 * | 4/2020 | Sun | A44B 11/2561 | |
| 10,667,583 B2 * | 6/2020 | Moran | A44B 11/2569 | |
| 11,109,648 B1 * | 9/2021 | Crawford | A44B 11/266 | |
| 2006/0048350 A1 * | 3/2006 | Coulombe | A44B 11/253 | 24/634 |
| 2009/0013510 A1 * | 1/2009 | Liang | A44B 11/266 | 24/648 |
| 2010/0071173 A1 * | 3/2010 | Hortnagl | A44B 11/2592 | 24/651 |
| 2010/0243373 A1 * | 9/2010 | Johnson | A44B 11/2557 | 24/171 |
| 2011/0162177 A1 * | 7/2011 | Von Der Ahe | A44B 11/2569 | 24/640 |
| 2012/0124790 A1 * | 5/2012 | Richards | A44B 11/2519 | 24/593.1 |
| 2014/0298630 A1 * | 10/2014 | Hortnagl | A44B 11/006 | 24/697.2 |

* cited by examiner

LATCH ASSEMBLY

BACKGROUND OF THE INVENTION

Cross-Reference to Related Applications

None.

Field of the Invention

The present invention relates to latches, specifically to latch assemblies for latching parts of objects together.

Description of the Related Art

In the related art, it has been known to use latches to secure items such as purses, satchels, handbags, briefcases, luggage, backpacks, diaries, tool boxes, etc. Mechanical latches represent a method of releasably engaging and holding or otherwise joining or assembling objects such as panels, enclosures, belts, fabric, or other similar, discreet objects. A wide variety of special-purpose fasteners are currently employed in the industry for quick-operating, repeated access applications.

Specifically, push button operated latches and locks are well known. The contents of objects are typically secured from intrusion and unwanted inspection by the use of push button latches. It has been the usual practice for many years in the design and construction of combined latch and lock mechanisms for luggage cases and the like to provide a spring biased bolt on one of the separable container sections which is urged into latching relation with a keeper on the other separable case section.

Push button latches can be attached to objects or incorporated in a variety of ways. Some improvements have been made in the field. Examples of references related to the present invention are described below in their own words, and the supporting teachings of each reference are incorporated by reference herein:

U.S. Pat. No. 3,605,210, issued to Lohr, discloses a safety seat belt buckle having a pair of locking members which engage opposite side edges of a plate-like tongue to prevent its removal from a latched position in the buckle. A release member on the buckle is connected to the locking members such that they can be moved toward release positions either by a motion of the release member, or by contact with the tongue as it is received toward its latched position.

U.S. Pat. No. 4,321,734, issued to Gandelman, discloses a clasp assembly is provided for securing together the free ends of opposed flexible members and includes a first coupling member that is joined to the free end of one of the flexible members and a second coupling member that is joined to the free end of the other flexible member. In the latched position the coupling members appear to be an integral part of the flexible members and impart an ornamental appearance thereto. The first coupling member includes a box element in which a transversely extending spring is located and has a pair of snap levers pivotally mounted on the sides thereof. The second coupling member includes an outwardly extending tongue element that is formed with opposed notches that are engageable with the snap levers for locating the tongue in a latched position within the first coupling member, the snap levers being pivotally movable relative to the tongue and against the action of the spring from a closed to an open position upon the application of a force thereto, for releasing the tongue from engagement with the snap levers and thereby disengaging the coupling members.

U.S. Pat. No. 4,792,165, issued to Nishimura, discloses a plush latch device composed of a case and a slider which slides into the case and out therefrom. The movement of the slider is controlled by a guide mechanism disposed between the slider and the case. The guide mechanism consists of an annular guide passageway formed in a cone side inner surface of the case and a guide lever having a guide member which moves along the guide passageway while being pressed against the side wall thereof. The guide passageway is formed with a substantially V-shaped stoppage portion for stopping the slider within the case. The guide lever has a support spindle formed with a flat surface having an angle to the longitudinal direction of the guide lever to impart forces for pressing the side wall of the guide passageway, the guide lever rotating about the support spindle. The rotary moment is imparted to the guide lever by pushing the support spindle by a coil spring for moving the slider.

U.S. Pat. No. 5,217,262, issued to Kurosaki, discloses a latch device including a pair of circuital cam grooves having different planar shapes formed in opposite surfaces of a latch body. A guide lever is inserted into the circuital cam grooves so that tips of tracing portions of the guide lever do not contact bottom surfaces of the circuital cam grooves. The circuital cam grooves have a heart-shaped projection and a triangular projection, such that torsion is generated in the tracing portions because of differences in configuration of the circuital cam grooves. A restoring force of the guide lever acting opposite the torsional force causes the tracing portions to circulate in a given direction. As a result, compared with conventional latch devices, fewer components may be used. Wear on the circuital grooves of the latch body can be prevented. When the torsional force is eliminated, the tracing portions move in a direction where the groove wall surfaces are not provided. No unpleasant impact sound (operating sound) is produced because the tracing portions do not strike against the groove wall surfaces.

U.S. Pat. No. 5,273,328, issued to Kurosaki, discloses a lock mechanism for causing an openable member such as a cover or a door of a box or the like to engage with or disengage from a main body as the openable member is pressed, and a latch device for retaining a latch body in the housing in a state in a pushed-in state and in a withdrawn state. The center of rotation of each of a pair of arms of the latch device is formed on substantially the same line as a line of action of a force acting on a retaining surface of each of the arms for retaining a striker. A fitting hole, a guide hole, a slanted guide surface, and a fitting hole are provided to allow a tracing member of the latch device to be fitted from outside the housing at the time of assembling the tracing member to the housing. In the lock mechanism and the latch device, the tracing member is caused to trace side walls of a pair of circulatory guide paths by making use of the resilient restoring force of a resilient tracing member, and the tracing member is maintained in a state of noncontact with the bottom surfaces of the circulatory guide paths during tracing.

The inventions heretofore known suffer from a number of disadvantages which include not being easily scalable to different sizes, having less consistent manufacturing, being difficult to latch, having less control over release, having the ability to be accidentally released, being difficult to manufacture, being difficult to use, being unreliable, being more likely to get stuck, and being weaker.

What is needed is a latch assembly that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available latch assemblies. Accordingly, the present invention has been developed to provide a latch assembly for latching.

The latch assembly may comprise a latch buckle. The latch buckle may include: a buckle housing; a first lateral aperture that may be disposed along a first side of the buckle housing; a second lateral aperture that may be disposed along a second side of the buckle housing; a pair of levers that may be h-shaped (chair-shaped) and/or each be pivotally coupled to an interior of the buckle housing, and/or extending out of the first lateral aperture and/or the second lateral aperture, respectively; a spring ring that may be disposed between the pair of h-shaped levers; a pair of springs, each spring may be coupled to an interior of the buckle housing and/or an h-shaped lever, respectively; and/or a buckle aperture that may be disposed along a top of the buckle housing and/or between the pair of h-shaped levers. The latch assembly may also comprise a latch tongue that may include: a tongue plate; a plate spacer that may be coupled to the tongue plate and/or extending orthogonal therefrom; and/or a latch flange that may be coupled to the plate spacer and/or extending orthogonal therefrom, and/or that may be configured to be received by the buckle aperture. The latch tongue may be selectably coupleable to the latch base. The levers may include a lever arm with a hook extending therefrom. The hook may extend orthogonally from the lever arm. The levers may pivot about points adjacent to the spring ring and/or may be disposed on opposite sides thereof.

The buckle housing may include a front base plate, and/or a back base plate disposed opposite the front base plate and/or coupled to the front base plate. The back base plate may further include a plurality of lever traps that may be disposed along a surface of the back base plate proximate to the front base plate. The tongue plate and/or the latch flange may be planar. The back base plate may include a lip that may be disposed along a bottom of the back base plate and/or coupled to a bottom of the front base plate.

The back base plate may include a plurality of spring ring traps that may be disposed along a surface of the back base plate proximate to the front base plate. The second side aperture may be disposed opposite the first side aperture. The h-shaped levers may pivot about the spring ring. A diameter of the spring ring may decrease and/or increase when the h-shaped levers pivot.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
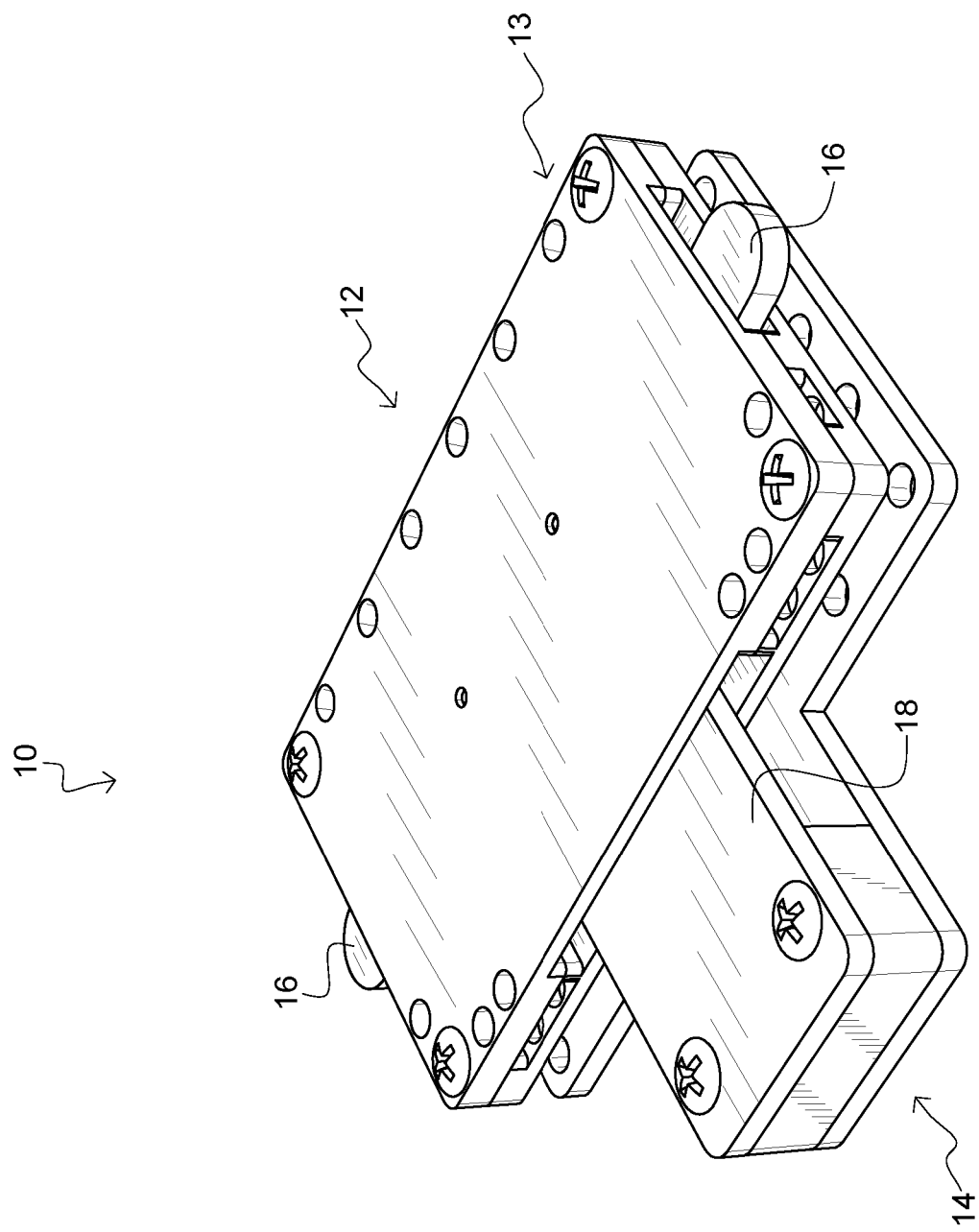
FIG. 1 is a right side perspective view of a latch assembly, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of." In addition, terms like "front," "back," "left," and "right," are used merely to show location.

FIG. 1 illustrates a right side perspective view of a latch assembly 10, according to one embodiment of the invention. There is shown a latch assembly 10 with a latch buckle 12, and a latch tongue 14 removably coupled to the latch buckle 12. The latch buckle 12 includes a buckle housing 13 and h-shaped levers 16 protruding through the buckle housing 13. The latch tongue 14 includes a latch flange 18 for removably coupling the latch tongue 14 to the latch buckle 12.

The illustrated latch buckle 12 includes a buckle housing 13. As shown, the buckle housing 13 may substantially contain (or house) components of the latch buckle 12, such as, but not limited to, the levers 16. The buckle housing 13 may have any size and/or shape for housing components of the latch buckle 12 and/or removably coupling to the latch tongue 14, such as, but not limited to: square, rectangular, elongated, ovoid, round, and so on. Further, the buckle housing 13 may be comprised of a variety of materials, such as, but not limited to: metal, plastic, wood, rubber, polymers and/or glass.

As shown, the levers 16 may be substantially disposed within the buckle housing 13. Also shown, the 16 levers may protrude from the buckle housing 13 so that the levers 16 may function as push-buttons for releasing the latch flange 18 for uncoupling the latch tongue 14 from the latch buckle 12. The levers 16 may have any size and/or shape for removably coupling to the latch flange 18 of the latch tongue 14 and for functioning as push-buttons. Likewise, the levers 16 may be comprised of a variety of materials for removably coupling to the latch flange 18, such as, but not limited to: metal, plastic, wood, rubber, polymers and/or glass.

The illustrated latch tongue 14 includes a latch flange 18. The latch flange 18 removably couples the latch tongue 14 to the buckle housing 13. The latch flange 18 may removably couple to the h-shaped levers 16. For instance, in one non-limiting embodiment, the latch flange 18 may removably couple to the levers 16 by tight-fitting, such as spring-fitting. Accordingly, the latch flange 18 may have any size or shape that compliments the size and/or shape of the levers 16 for removably coupling to the levers. For example, the latch flange 18 may be shaped, such as, but not limited to: T-shaped, mallet-shaped, club-shaped, fan-shaped, etc. Likewise, the latch flange 18 may be forked. Moreover, the latch flange 18 may be comprised of a variety of materials for complimenting the levers 16, such as, but not limited to: metal, plastic, wood, rubber, polymers, and/or glass.

In operation of one embodiment of the invention, there is a latch assembly 10 that includes a latch buckle 12 removably coupled to a latch tongue 14. The latch assembly may be a light-weight assembly. The latch buckle 12 includes levers 16 that are a dual release. A major portion of the levers 16 are disposed within an interior of a buckle housing 13 of the latch buckle 12. As a result, a portion of a latch flange 18 of the latch tongue 14 passes through the interior of the buckle housing 13 to couple to the levers 16 in an interior of the housing 13. The levers 16 function to release the latch flange 18 when simultaneously pressed, or pushed, and thereby not coming accidentally unlatched.

Advantageously, the illustrated latch assembly may be coupled to a pair of structures, wherein the buckle is coupled to one structure and the tongue is coupled to another structure and those structures may then be selectively mated together and selectably released from each other as desired by applying force to the ends of the lever arms that extend from the buckle housing. Further, the spacing and tolerances of the various components may be such that both lever arms must be pivoted in order to release the tongue from the buckle, thereby reducing the likelihood of accidental separation of the tongue from the buckle.

Such a latch assembly may be applied to a great variety of associated structures, including but not limited to purses, bags, luggage, clothing, wall mountings, decorative accessories, modular systems, electronics installations, tool belts, mounts for vehicle interiors, and the like and combinations thereof. The illustrated tongue and buckle may be affixed to such structures by various means, including but not limited to screws, rivets, pins, glue, contact adhesive, hook-and-loop, magnets, and the like and combinations thereof.

In one non-limiting embodiment, the buckle is disposed within a container (e.g. a purse) with a slit through an exterior wall of the container that matches up with the aperture of the buckle so that a tongue may enter thereinside and couple to the buckle from outside the container. There may be a plurality of tongues that each fit the buckle, with each tongue coupled to a secondary bag, decorative item, or the like such that the user may selectably couple a plurality of different items to their container. Advantageously, someone without access to an interior of the container would not be able to release the latch assembly as the ends of the lever arms would be within the container.

Figure 2:
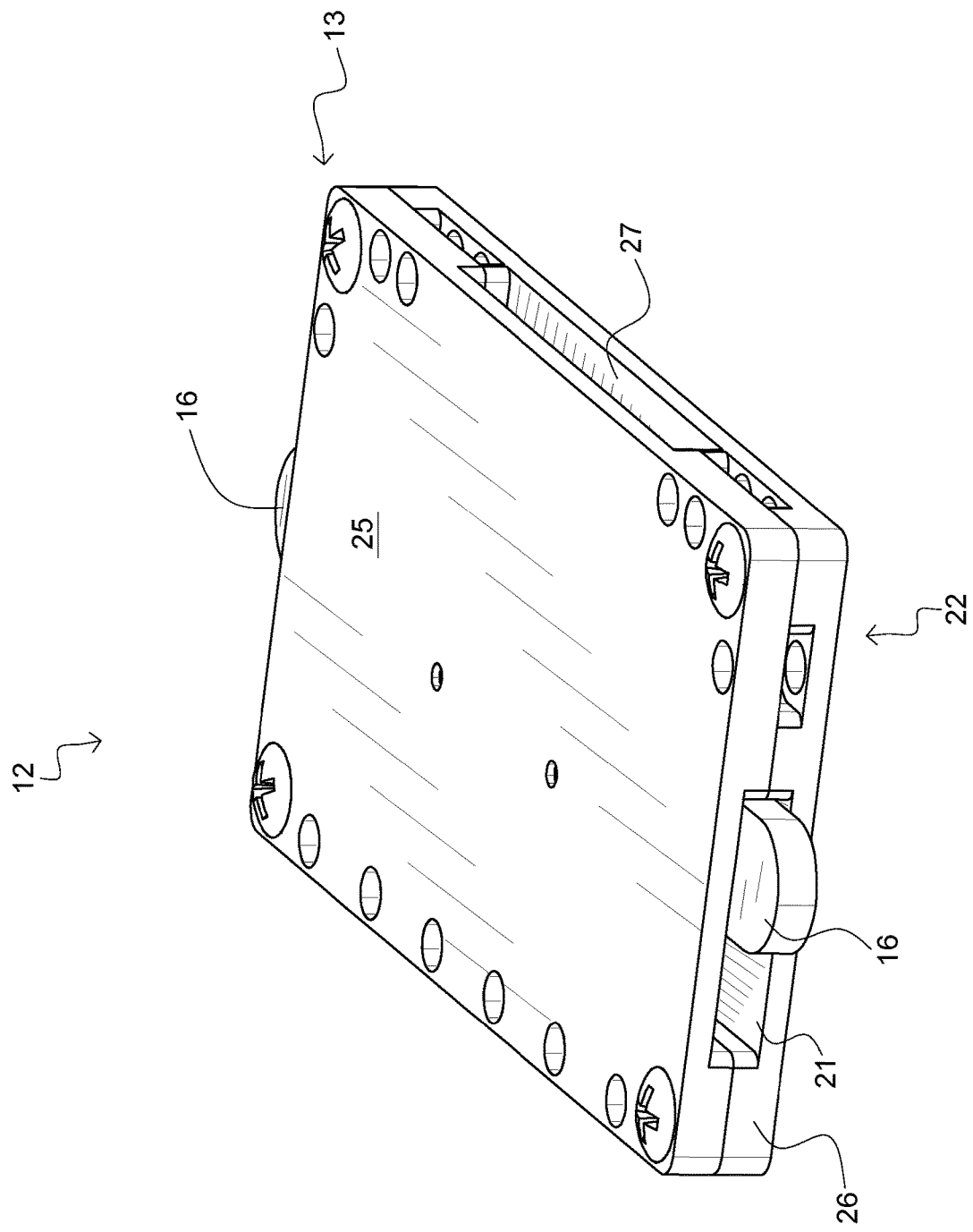
FIG. 2 is a left side perspective view of a latch buckle, according to one embodiment of the invention.

FIG. 2 illustrates a left side perspective view of a latch buckle 12, according to one embodiment of the invention. There is shown a latch buckle 12 with a buckle housing 13 and levers 16 substantially disposed within the buckle housing 13. The buckle housing 13 includes a first lateral aperture 21 disposed along a first side 22 of the buckle housing 13. The buckle housing 13 also includes a front base plate 25 with a back base plate 26 coupled to the front base plate 25. Disposed between the front base plate 25 and the back base plate 26 there is a buckle aperture 27.

The illustrated buckle housing 13 includes a first lateral aperture 21 disposed along a first side 22. As shown, the levers 16 may protrude from the lateral aperture 21. Accordingly, the lateral aperture 21 may have any size or shape to allow the levers 16 to extend from the buckle housing 13.

Also, the illustrated buckle housing 13 includes a front base plate 25 and a back base plate 26 coupled to the front base plate 25. The base plates 25 and 26 may be coupled by a variety of coupling mechanisms, such as, but not limited to: screws, nails, bolts, pegs, snap-fit, dowels, adhesives, etc. The front base plate 25 and the back base plate 26 may be sized and/or shaped to substantially contain the levers 16. Similarly, the front base plate 25 and the back base plate 26 may be sized and/or shaped to form apertures 21 and/or allow the levers 16 to protrude therefrom. The base plates 25 and 26 may be comprised of a variety of materials, such as, but not limited to: metal, plastic, wood, rubber, polymers, and/or glass.

Further illustrated, there is a buckle aperture 27 disposed between the front base plate 25 and the back base plate 26. As a result, the front base plate 25 and the back base plate 26 may be shaped and/or sized to provide a buckle aperture 27. The buckle aperture 27 may have any shape and/or size configured to receive the latch flange of the latch tongue (See e.g., FIG. 1, items 18 and 14, respectively).

Figure 3:
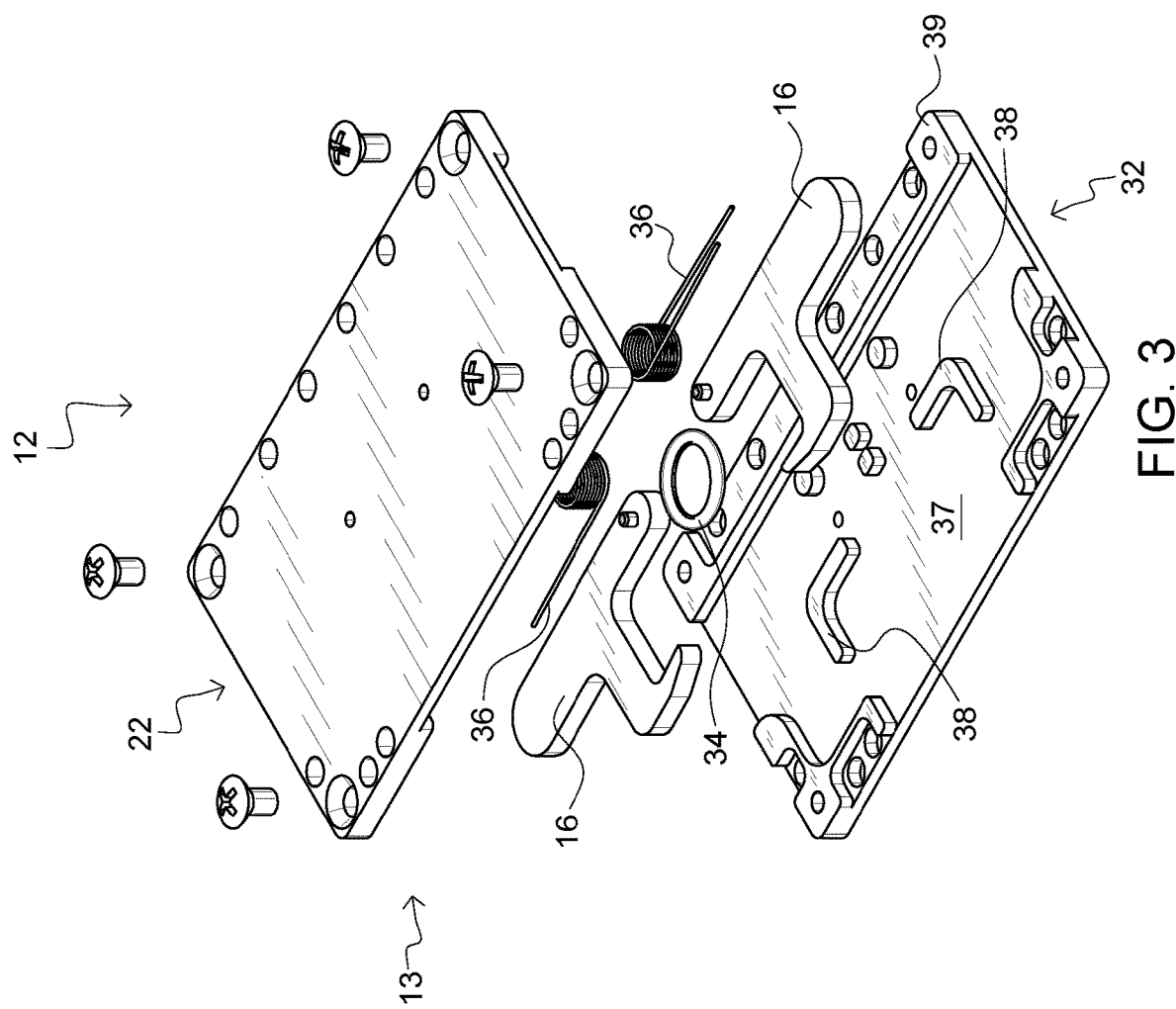
FIG. 3 is a right side exploded perspective view of a latch buckle, according to one embodiment of the invention.

FIG. 3 illustrates a right side exploded perspective view of a latch buckle 12, according to one embodiment of the invention. As shown, the latch buckle 12 includes a buckle housing 13 with a pair of levers 16 substantially disposed therein. The latch buckle 12 has a first side 22 with a second side 32 disposed substantially opposite the first side 22. Also disposed within the buckle housing 13 there is shown a spring ring 34 and a pair of springs 36. Further, disposed along an interior 37 of the back base plate (See e.g., FIG. 2, item 26), of the buckle housing 13 are a plurality of lever traps 38 and a base plate lip 39.

The illustrated levers 16 are h-shaped (chair-shaped) and are substantially disposed within the buckle housing 13 with just the tips extending outside thereof so that they may be manipulated by hand to pivot as desired. The illustrated levers are mirror images of each other and each include a lever arm with a securing pin at an end thereof opposite the end that extends outside the buckle housing. The illustrated levers include hooks that extend orthogonally from the lever arms near a midpoint thereof. The hooks each point inward and form the structure that secures the latch flange within the buckle when it is disposed therein. Further, pivoting the lever arm about the securing pin causes the hooks to change position. Pivoting one direction traps the latch flange and pivoting the opposite direction releases the latch flange. The illustrated springs 36 bias the lever arms such that the hooks are in a mode to trap the latch flange. Further, the hooks each include an angled tip that allows the latch flange to cause the lever arms to pivot as the latch flange is entering between the hooks and the springs then snap the hooks back into a trapping mode after the latch flange has fully entered the hooks. The illustrated levers pivot about points (at the securing pins) adjacent to the spring ring and are disposed on opposite sides thereof.

The h-shaped levers 16 may be rotatably coupled to the buckle housing 13 so that they may rotate about an axis and/or provide leverage. The h-shaped levers 16 may have any size and/or shape for receiving and/or coupling to the latch flange of the latch tongue (See e.g., FIG. 1, items 18 and 14, respectively). For example, the h-shaped levers 16 may be shaped such as, but not limited to: h's, chairs, y's, 4's, and so on. Further, the h-shaped levers 16 may be identical and/or mirror-images. The h-shaped levers 16 may protrude from the buckle housing 13 so that they may function as push-buttons for releasing the latch flange (See e.g., FIG. 1, item 18). In addition, the h-shaped levers 16 may be comprised of a variety of materials, such as, but not limited to: metal, plastic, wood, rubber, polymers, and/or glass.

Additionally illustrated, disposed within the buckle housing 13 there is shown a spring ring 34 and a pair of springs 36. The spring ring 34 may provide a spring-back force to help the latch flange (See e.g., FIG. 1, item 18) release from the h-shaped levers 16. The spring ring 34 provides a bias against the latch flange, essentially pushing the latch flange out of the buckle when the h-shaped levers release it. The illustrated spring ring 34 is a torus, but it may have any size and/or shape and/or be comprised of any material that provides the described bias force to facilitate release the latch flange (See e.g., FIG. 1, item 18). In one non-limiting embodiment, the spring ring 34 may be comprised of rubber, plastic, composites thereof and/or other elastically deformable materials.

The pair of springs 36 is functionally coupled to the h-shaped levers 16, and thereby allows the h-shaped levers 16 to pivot and/or to function as push buttons. Thus, the pair of springs 36 may bias the h-shaped levers 16 in open and closed positions. Likewise, the pair of springs 36 may have any size and/or shape and/or be comprised of any material to allow the h-shaped levers 16 to pivot. In one non-limiting embodiment, the pair of springs 36 may be comprised of metal.

Further illustrated, disposed along an interior 37 of the back base plate (See e.g., FIG. 2, item 26), of the buckle housing 13, there are a plurality of lever traps 38. The lever traps 38 may be integral to the back base plate (See e.g., FIG. 2, item 26) or may be extensions thereof. As a result, the lever traps 38 may be comprised of a variety of material, such as, but not limited to: metal, plastic, wood, rubber, polymers, and/or glass. As illustrated, the plurality of lever traps 38 are substantially L-shaped; however, the plurality of lever traps 38 may have any size and/or shape for trapping, securing, stabilizing, etc. the h-shaped levers 16, such as, but not limited to: c-shaped, v-shaped, u-shaped, and so on.

Also illustrated, the back base plate (See e.g. FIG. 2, item 26) includes a base plate lip 39. The base plate lip 39 is disposed along a length of the back base plate (See e.g., FIG. 2, item 26). The base plate lip 39 may be integral to the back base plate (See e.g., FIG. 2, item 26). Accordingly, the base plate lip 39 may be an extension of the back base plate (See e.g., FIG. 2, item 26) and may be comprised of a variety of materials, such as, but not limited to: metal, plastic, wood, rubber, polymers, and/or glass. The base plate lip 39 may provide spacing between the front base plate and the back base plate (See e.g., FIG. 2, items 25 and 26, respectively) for housing components of the latch buckle (See e.g., FIG. 1, item 12) within the buckle housing (See e.g., FIG. 1, item 13). As a result, the base plate lip 39 may have any size, shape, length, etc. configured to provide spacing.

Figure 4:
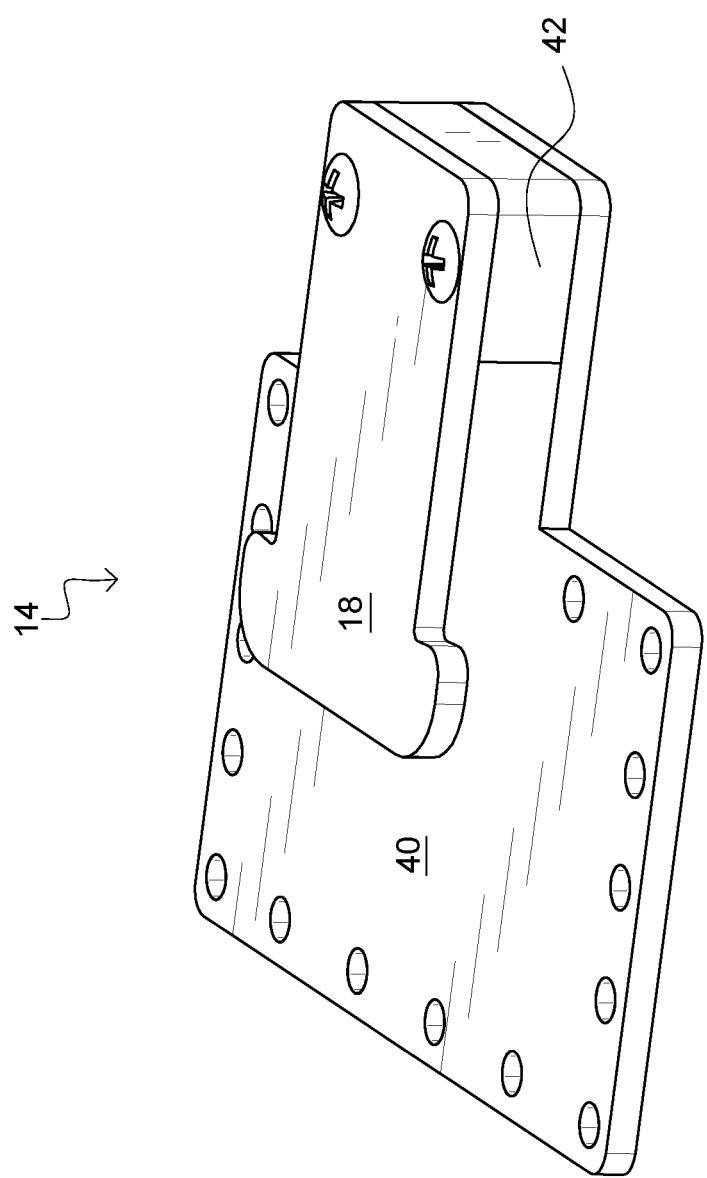
FIG. 4 is a left side perspective view of a latch tongue, according to one embodiment of the invention.

FIG. 4 illustrates a left side perspective view of a latch tongue 14, according to one embodiment of the invention. As shown, the latch tongue 14 includes a latch flange 18. Coupled to the latch flange 18 is a plate spacer 42, and coupled to the plate spacer is a tongue plate 40.

The illustrated latch flange 18 extends from the latch tongue 14 so that it may be received by the h-shaped levers (See e.g., FIG. 1, item 16) of the buckle housing (See e.g., FIG. 1, item 13). For instance, in one non-limiting embodiment, the latch flange 18 may slide into the buckle housing (See e.g., FIG. 1, item 13). Accordingly, the latch flange 18 may have any size and/or shape for removably coupling to the latch buckle (See e.g., FIG. 1, item 12). For example, the latch flange 18 may be shaped, such as, but not limited to: T-shaped, mallet-shaped, club-shaped, fan-shaped, etc. Similarly, the latch flange 18 may be planar and/or substantially flat. More, the latch flange 18 may be comprised of a variety of materials for complimenting the h-shaped levers 16, such as, but not limited to: metal, plastic, wood, rubber, polymers, and/or glass.

Also illustrated, the latch flange 18 is coupled to a plate spacer 42. The plate spacer 42 spaces the latch flange 18 from the tongue plate 40. Thus, the plate spacer 42 is coupled to, and disposed between, the latch flange 18 and the tongue plate 40. The plate spacer 42 may be sized and/or shaped to provide spacing. For example, the plate spacer 42 may have a variety of lengths, diameters, and/or shapes for spacing, such as, but not limited to: cubed, cylindrical, trapezoidal, and so on. The plate spacer 42 may be integral to the tongue plate 40 such that the plate spacer 42 is an extension of the tongue plate. As a result, the plate spacer 42 may also be comprised of a variety of materials, such as, but not limited to: metal, plastic, wood, rubber, polymers, and/or glass.

Further, the illustrated tongue plate 40 is coupled to the plate spacer 42 at an end opposite the latch flange 18. The tongue plate 40 may extend from the plate spacer in a direction parallel to the latch flange 18. The tongue plate 40 may provide support, such as a base, for the plate spacer 42 and the latch flange 18. Accordingly, the tongue plate may have any shape and/or size for providing support. The tongue plate 40 may be planar and/or substantially flat. The tongue plate 40 may be comprised of a variety of materials, such as, but not limited to: metal, plastic, wood, rubber, polymers, and/or glass. In one non-limiting embodiment, two or more of the tongue plate 40, plate spacer 42, and latch flange 18 may be a single component (e.g. molded as a single shaped piece) instead of a plurality of components coupled to each other.

Figure 5:
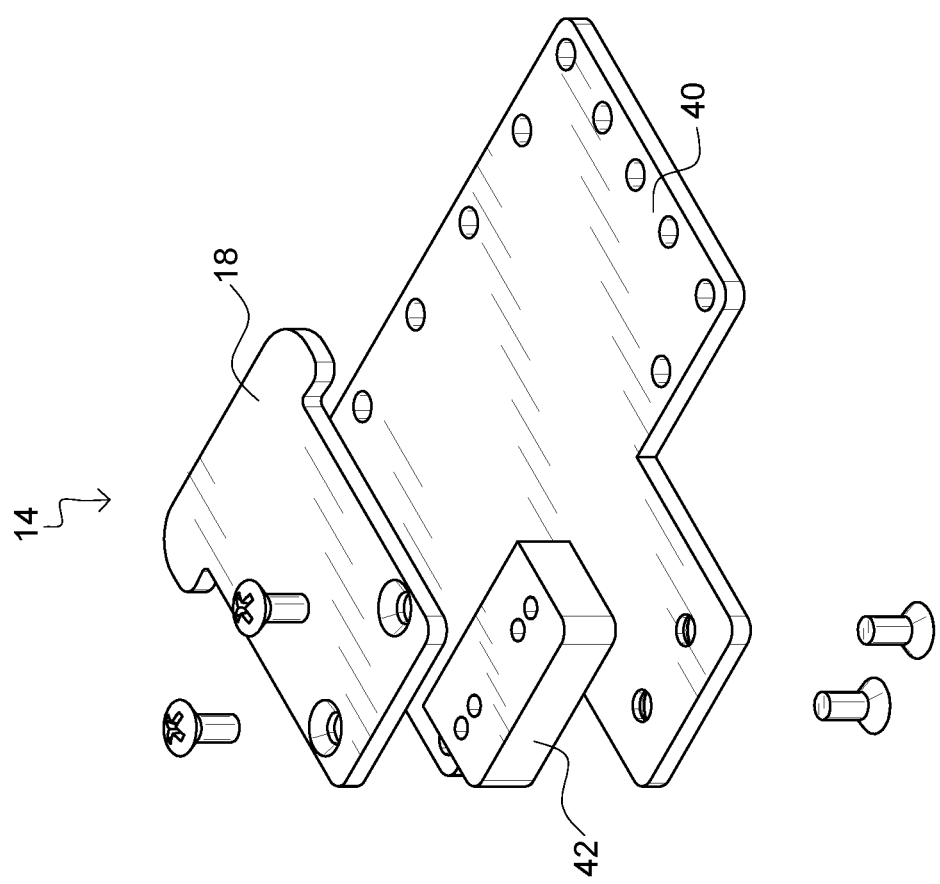
FIG. 5 is a right side exploded view of a latch tongue, according to one embodiment of the invention.

FIG. 5 illustrates a right side exploded view of a latch tongue 14, according to one embodiment of the invention. As shown, the latch tongue 14 includes a latch flange 18. Coupled to the latch flange 18 is a plate spacer 42, and coupled to the plate spacer is a tongue plate 40.

The illustrated plate spacer 42 is disposed between the latch flange 18 and the tongue plate 40. The latch flange 18 and the tongue plate 40 may be coupled to the plate spacer 42 by a variety of coupling mechanisms, such as, but not limited to: screws, nails, bolts, pegs, dowels, adhesives, etc. Hence, the latch flange 18, the tongue plate 40, and the plate spacer 42, may be comprised of a variety of materials, such as, but not limited to: metal, plastic, wood, rubber, polymers, and/or glass.

Figure 6:
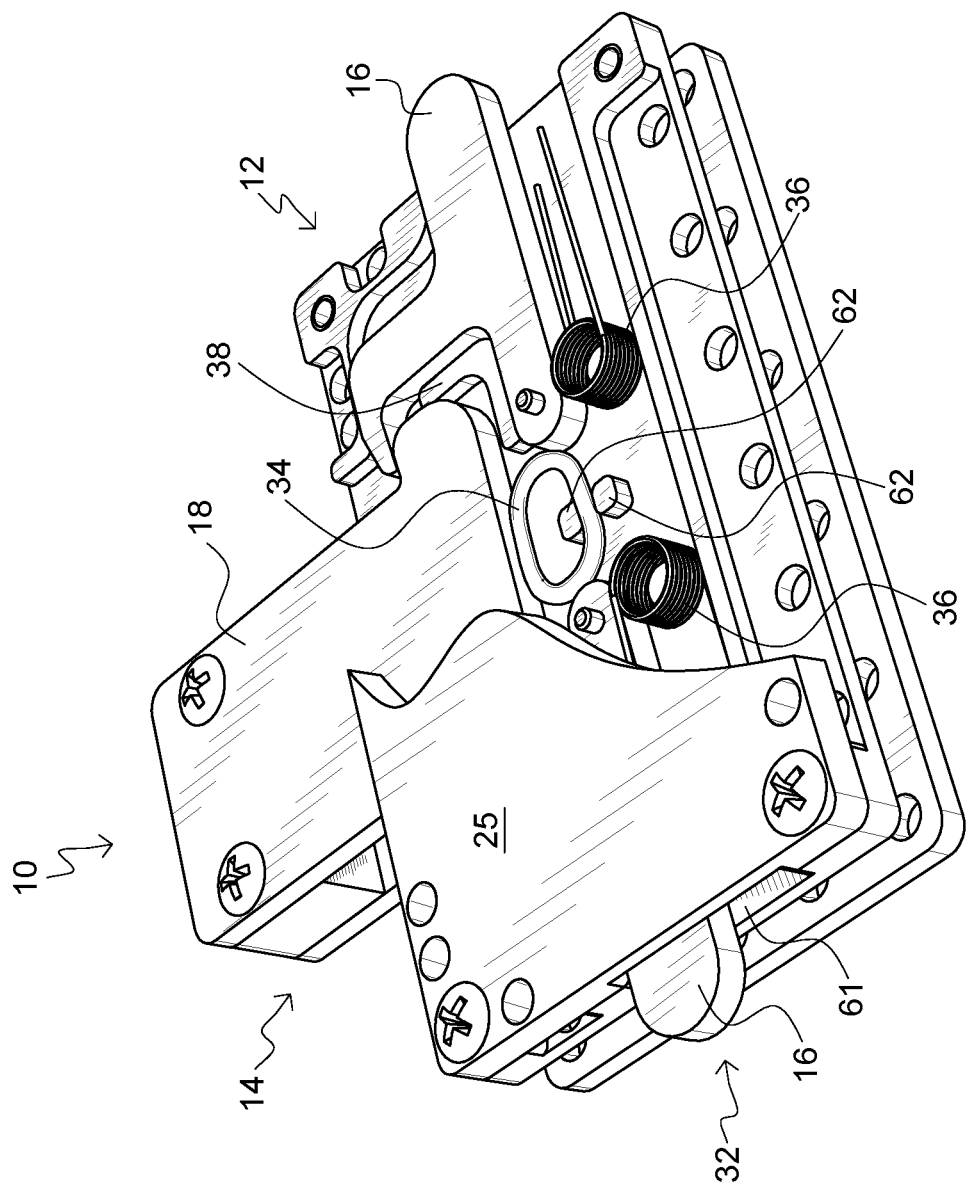
FIG. 6 is a back side perspective view of a latch assembly with a cut-away of a front base plate, according to one embodiment of the invention.

FIG. 6 illustrates a back side perspective view of a latch assembly 10 with a cut-away of a front base plate 25, according to one embodiment of the invention. As shown, the latch assembly 10 includes a latch buckle 12 with a pair of h-shaped levers 16, and a latch tongue 14 with a latch flange 18. The latch assembly 10 also includes a second lateral aperture 61 disposed along a second side 32, a spring ring 34 disposed between a plurality of spring ring traps 62 and along the latch flange 18, and a pair of springs 36. The spring ring traps 62 are nubs extending into the space around the spring ring and prevent it from traveling within the buckle so that when the latch flange presses against the spring ring, the spring ring maintains its force/bias against the latch flange.

The illustrated latch assembly 10 includes a latch buckle 12 coupled to a latch tongue 14. The latch buckle 12 may be coupled to the latch tongue such as by push-button/spring release. For example, in one embodiment, the latch buckle 12 includes a pair of h-shaped levers 16 disposed within the latch buckle 12. Functionally coupled to the pair of h-shaped levers 16 are a pair of springs 36 that may function to pivot the h-shaped levers and thereby release the latch tongue 14. The h-shaped levers 16 may protrude from the latch buckle 12. For instance, in one embodiment, the h-shaped lever 16 protrudes from a second lateral aperture 61 disposed along a second side 32 of the latch buckle. As a result, the second lateral aperture 61 may be shaped and/or sized to allow an h-shaped lever 16 to protrude from the latch buckle 12 and thereby function as a push-button release. In one non-limiting embodiment, both h-shaped levers 16 must be pushed simultaneously in order to release the latch tongue 14.

Also illustrated, the latch tongue 14 includes a latch flange 18. Disposed along the latch flange 18 is a spring ring 34. The spring ring 34 is disposed within the latch buckle 12. The spring ring 34 abuts the latch flange 18 and may flex so that it provides a force that assists in release of the latch flange 18 from the latch buckle 12 when the h-shaped levers 16 are pushed. Accordingly, an effective diameter of the spring ring 34 may increase or decrease when the latch flange presses against or releases from contact with the spring ring 34. For these reasons, the spring ring may be comprised of a flexible material, such as, but not limited to: rubber, plastic, polymers, etc. While the illustrated spring ring is circular, the spring ring may be of a different shape/configuration, so long as it operates to bias the tongue to exit the buckle, such as but not limited to a disc, oval, square, sphere, irregular shape, triangle, pyramid, and the like and combinations thereof.

Further illustrated, the spring ring 34 is disposed between a plurality of spring ring traps 62. The spring ring traps 62 may trap, secure, stabilize, hold in place etc. the spring ring 34. As a result, the spring ring traps 62 may be sized and/or shaped to trap the spring ring 34. For instance, the spring ring traps 62 may be shaped, such as, but not limited to: cones, pyramids, cylinders, cubes, and so on. The spring ring traps 62 are disposed within the latch buckle 12 and may be integral to the latch buckle 12. Hence, the spring ring traps 62 may be extensions of the latch buckle. Accordingly, the spring ring traps 62 may be comprised of a variety of materials, such as, but not limited to: metal, plastic, wood, rubber, polymers, and/or glass.

Figure 7:
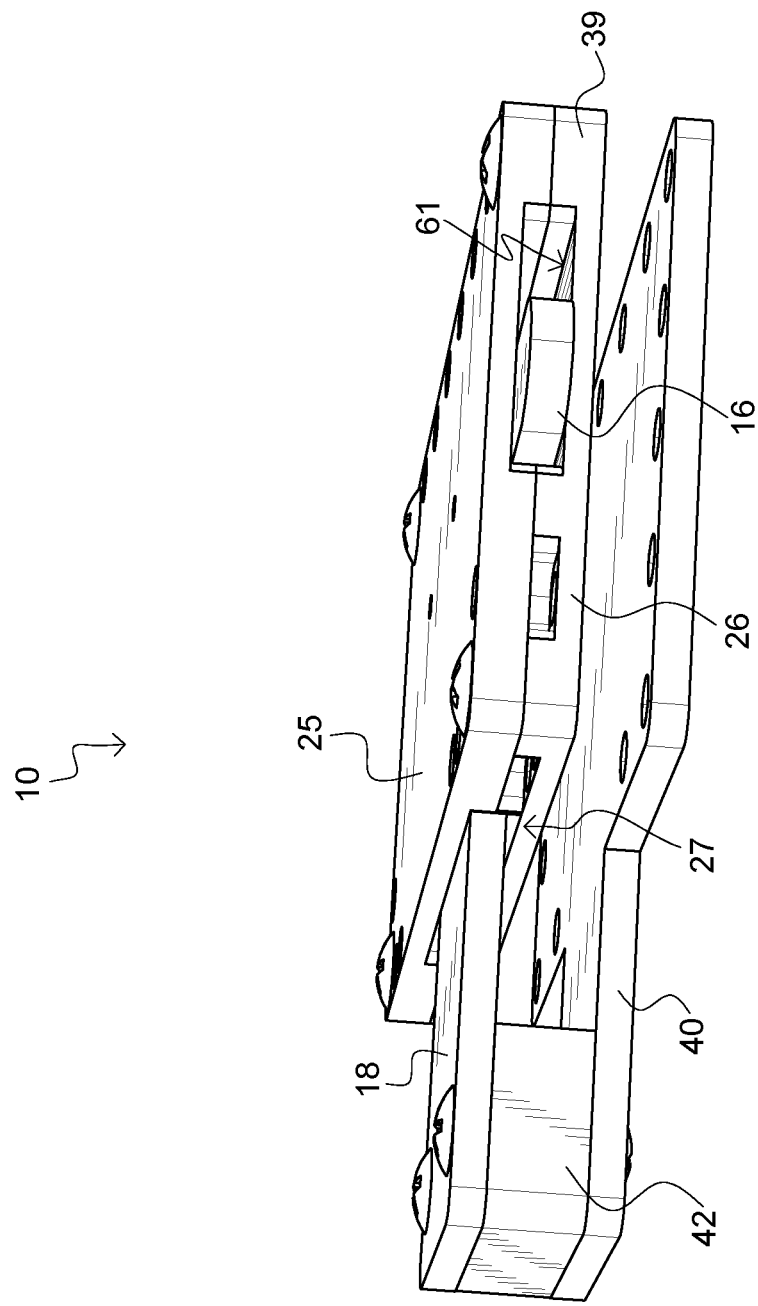
FIG. 7 is a left side perspective view of a latch assembly, according to one embodiment of the invention.

FIG. 7 illustrates a left side perspective view of a latch assembly 10, according to one embodiment of the invention. As shown, the latch assembly 10 includes an h-shaped lever 16 disposed between a front base plate 25 and a back base plate 26. The illustrated back base plate 26 includes a base plate lip 39. The latch assembly 10 also includes a latch flange 18 disposed within a buckle aperture 27 and removably coupled to the h-shaped levers 16. Coupled to the latch flange 18 is a plate spacer 42, and coupled to the plate spacer 42 is a tongue plate 40 so that the tongue plate 40 is disposed substantially below the back base plate 26. The latch assembly further includes a second lateral aperture 61.

The illustrated tongue plate 40 is disposed below the back base plate 26 along substantially the entire length of the back base plate 26. Accordingly, the tongue plate 40 provides additional support for the latch assembly 10. As a result, the tongue plate 40 may have any size, shape, length, diameter, etc. for supporting the latch assembly 10. Likewise, the tongue plate 40 may be comprised of a variety of materials, such as, but not limited to: metal, plastic, wood, rubber, polymers, and/or glass.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures illustrate a latch flange and h-shaped levers for latching, it is envisioned that any design of complimenting male and female components may be used for latching. Additionally, although the figures illustrate a single latch assembly, it is envisioned that objects may include multiple latch assemblies for latching. It is also envisioned that the latch assembly may be used for latching a plethora of objects, such as, but not limited to: purses, satchels, handbags, briefcases, luggage, backpacks, diaries, tool boxes, etc. More, the latch assembly may be sewn into the object into which it is being installed.

It is expected that there could be numerous variations of the design of this invention. An example is that the latch assembly may have multiple latch flanges or that the latch flanges may be forked. Likewise, although the figures illustrate a pair of h-shaped levers, the assembly may have any number of h-shaped levers.

Finally, it is envisioned that the components of the assembly may be constructed of a variety of materials, such as, but not limited to: metal, plastic, wood, rubber, polymers, and/or glass. The components of the assembly may be constructed by injection molding.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A latch assembly, comprising:
   a. a latch buckle including:
      i. a buckle housing;
      ii. a first lateral aperture disposed along a first side of the buckle housing;
      iii. a second lateral aperture disposed along a second side of the buckle housing;
      iv. a pair of h-shaped levers, each pivotally coupled to an interior of the buckle housing, and extending out of the first lateral aperture and the second lateral aperture, respectively,
      v. a deformable closed-loop elastic ring disposed between the pair of h-shaped levers;
      vi. a pair of springs, each spring being coupled to an interior of the buckle housing one of the h-shaped levers, respectively; and
      vii. a buckle aperture disposed along a top of the buckle housing and between the pair of h-shaped levers;
   b. a latch tongue including:
      i. a tongue plate;
      ii. a plate spacer, coupled to the tongue plate and extending orthogonal therefrom; and
      iii. a latch flange, coupled to the plate spacer and extending orthogonal therefrom, configured to be received by the buckle aperture, wherein the latch tongue is selectably coupleable to a latch base.

2. The assembly of claim 1, wherein the buckle housing includes a front base plate, and a back base plate disposed opposite the front base plate and coupled to the front base plate.

3. The assembly of claim 2, wherein the back base plate further includes a plurality of lever traps disposed along a surface of the back base plate proximate to the front base plate.

4. The assembly of claim 1, wherein the tongue plate and the latch flange are planar.

5. The assembly of claim 2, wherein the back base plate includes a lip disposed along a bottom of the back base plate and coupled to a bottom of the front base plate.

6. The assembly of claim 2, wherein the back base plate includes a plurality of spring ring traps disposed along a surface of the back base plate proximate to the front base plate.

7. The assembly of claim 1, wherein the second side aperture is disposed opposite the first side aperture.

8. The assembly of claim 1, wherein the h-shaped levers pivot about a point adjacent to the spring ring.

9. The assembly of claim 1, wherein a diameter of the spring ring decreases and increases when the h-shaped levers pivot.

10. A latch assembly, comprising:
    a, a latch buckle, including:
       i. a buckle housing;
       ii. a first lateral aperture disposed along a first side of the buckle housing;
       iii. a second lateral aperture disposed along a second side of the buckle housing;
       iv, a pair of chair-shaped levers, each pivotally coupled to an interior of the buckle housing, and extending out of the first lateral aperture and the second lateral aperture, respectively, the pair of chair-shaped levers each including a lever arm having a hook extending therefrom;
       v. a deformable closed-loop elastic ring disposed between the pair of chair-shaped levers;
       vi. a pair of springs, each spring being coupled to an interior of the buckle housing one of the chair-shaped levers, respectively; and
       vii. a buckle aperture disposed along a top of the buckle housing, and between the pair of chair-shaped levers;
    b. a latch tongue, including:
       i. a tongue plate;
       ii. a plate spacer, coupled to the tongue plate and extending orthogonal therefrom; and
       iii. a latch flange, coupled to the plate spacer and extending orthogonal therefrom, configured to be received by the buckle aperture, wherein the latch tongue is selectably coupleable to a latch base.

11. The assembly of claim 10, wherein the buckle housing includes a front base plate, and a back base plate disposed opposite the front base plate and coupled to the front base plate.

12. The assembly of claim 11, wherein the back base plate further includes a plurality of lever traps disposed along a surface of the back base plate proximate to the front base plate.

13. The assembly of claim 12, wherein the tongue plate and the latch flange are planar.

14. The assembly of claim 13, wherein the back base plate includes a lip disposed along a bottom of the back base plate and coupled to a bottom of the front base plate.

15. The assembly of claim 14, wherein the back base plate includes a plurality of spring ring traps disposed along a surface of the back base plate proximate to the front base plate.

16. The assembly of claim 15, wherein the second side aperture is disposed opposite the first side aperture.

17. The assembly of claim 16, wherein the levers pivot about points adjacent to the spring ring and on opposite sides thereof.

18. The assembly of claim 17, wherein the hook of each lever extend orthogonally from the respective lever arm of the associated lever.

19. The assembly of claim 18, wherein the front base plate and the back base plate are planar.

20. A latch assembly, comprising:
   a. a latch buckle, including:
      i. a buckle housing;
      ii. a first lateral aperture disposed along a first side of the buckle housing;
      iii. a second lateral aperture disposed along a second side of the buckle housing;
      iv. a pair of h-shaped levers, each pivotally coupled to an interior of the buckle housing, and extending out of the first lateral aperture and the second lateral aperture, respectively;
      v. a deformable closed-loop elastic ring disposed between the pair of h-shaped levers;
      vi. a pair of springs, each spring being coupled to an interior of the buckle housing one of the h-shaped levers, respectively; and
      vii. a buckle aperture disposed along a top of the buckle housing, and between the pair of h-shaped levers;
   b. a latch tongue, including:
      i. a tongue plate;
      ii. a plate spacer, coupled to the tongue plate and extending orthogonal therefrom; and
      iii. a latch flange, coupled to the plate spacer and extending orthogonal therefrom, configured to be received by the buckle aperture, wherein the latch tongue is selectably coupleable to a latch base;
   c. wherein the buckle housing includes a front base plate, and a back base plate disposed opposite the front base plate and coupled to the front base plate;
   d. wherein the back base plate further includes a plurality of lever traps disposed along a surface of the back base plate proximate to the front base plate; and
   e. wherein the back base plate includes a plurality of spring ring traps disposed along a surface of the back base plate proximate to the front base plate.

\* \* \* \* \*